US012238615B2

(12) United States Patent
Gaspardone et al.

(10) Patent No.: US 12,238,615 B2
(45) Date of Patent: Feb. 25, 2025

(54) SYSTEM AND METHOD FOR MANAGING QUALITY OF SERVICE PROVIDED BY A COMMUNICATION SYSTEM TO AN UNMANNED AUTONOMOUS VEHICLE

(71) Applicant: Telecom Italia S.p.A., Milan (IT)

(72) Inventors: Marco Gaspardone, Turin (IT); Danilo Gotta, Turin (IT)

(73) Assignee: Telecom Italia S.p.A., Milan (IT)

( * ) Notice: Subject to any disclaimer, the term of this patent is extended or adjusted under 35 U.S.C. 154(b) by 379 days.

(21) Appl. No.: 17/786,169

(22) PCT Filed: Dec. 10, 2020

(86) PCT No.: PCT/EP2020/085443
§ 371 (c)(1),
(2) Date: Jun. 16, 2022

(87) PCT Pub. No.: WO2021/122271
PCT Pub. Date: Jun. 24, 2021

(65) Prior Publication Data
US 2023/0024033 A1  Jan. 26, 2023

(30) Foreign Application Priority Data

Dec. 17, 2019 (IT) .................. 102019000024334

(51) Int. Cl.
*H04W 4/029* (2018.01)
*G06Q 50/40* (2024.01)
(Continued)

(52) U.S. Cl.
CPC ............ *H04W 4/029* (2018.02); *G06Q 50/40* (2024.01); *H04W 28/0268* (2013.01); *H04W 4/40* (2018.02)

(58) Field of Classification Search
CPC ... H04W 4/029; H04W 28/0268; H04W 4/40; G06Q 50/40
(Continued)

(56) References Cited

U.S. PATENT DOCUMENTS

2019/0289613 A1   9/2019  Fanelli et al.
2019/0319686 A1*  10/2019 Chen, IV ............. H04B 7/0639
(Continued)

FOREIGN PATENT DOCUMENTS

| WO | 2018144761 A1 | 8/2018 |
|---|---|---|
| WO | 2018189576 A1 | 10/2018 |
| WO | 2019012308 A1 | 1/2019 |

OTHER PUBLICATIONS

Feb. 4, 2021—(WO) ISR and Written Opinion—App No. PCT/EP2020/085443.

(Continued)

*Primary Examiner* — Nghi H Ly
(74) *Attorney, Agent, or Firm* — Banner & Witcoff, Ltd.

(57) ABSTRACT

A system for managing QoS provided to user equipment included in an unmanned autonomous vehicle (UAV) by a wireless communication system comprising base stations, each providing radio coverage over a corresponding cell. The system comprises one or more computing devices to execute: a setup module to receive data identifying a predetermined path, and send a request of allocating dedicated radio resources for wireless links, the requested dedicated radio resources being expected sufficient to guarantee a QoS not lower than a predefined QoS value, and a QoS verify module to receive QoS data indicative of measured QoS and position data indicative of an actual position of the UAV during traveling, and verify whether the QoS actually during travelling is not lower than the predefined QoS value of the received QoS data and verify whether an actual path fol-
(Continued)

lowed by the UAV corresponds to the predetermined path of the received position data.

14 Claims, 2 Drawing Sheets

(51) Int. Cl.
*H04W 4/40* (2018.01)
*H04W 28/02* (2009.01)

(58) Field of Classification Search
USPC ...... 455/456.1, 404.2, 414.1, 418, 421, 431, 455/432.1
See application file for complete search history.

(56) References Cited

U.S. PATENT DOCUMENTS

| | | | | |
|---|---|---|---|---|
| 2019/0349426 | A1* | 11/2019 | Smith | H04W 4/70 |
| 2019/0363843 | A1* | 11/2019 | Gordaychik | H04L 1/08 |
| 2020/0186964 | A1* | 6/2020 | Lekutai | H04W 4/024 |

OTHER PUBLICATIONS

"5G Localization and Context-Awareness" by Stefania Bartoletti, Andrea Conti, Davide Dardari, and Andrea Giorgetti (https://www.5gitaly.eu/2018/wp-content/uploads/2019/01/5G-Italy-White-eBook-5G-Localization.pdf).

* cited by examiner

SYSTEM AND METHOD FOR MANAGING QUALITY OF SERVICE PROVIDED BY A COMMUNICATION SYSTEM TO AN UNMANNED AUTONOMOUS VEHICLE

BACKGROUND OF THE INVENTION

Field of the Invention

The present invention relates to a system and method for managing Quality of Service (QoS) provided by a communication system to an unmanned autonomous vehicle.

OVERVIEW OF THE RELATED ART

With the term of unmanned autonomous vehicle it is herein intended any kind of vehicle capable of moving (e.g., fly over the air, navigate over the sea, travel over the ground) without a human pilot, that is configured and designed to move in an automatic way by means of an automatic drive system. Said automatic drive system may be in turn either directly on-board, or located in a remote control station. Non-exhaustive examples of unmanned autonomous vehicles comprise, among the others, flying drones, Unmanned Aerial Vehicles (UAVs), sea gliders, automated robot vehicles, self-driving cars.

Nowadays, unmanned autonomous vehicles are exploited for performing several tasks in different fields for different applications. Some of these applications require that the unmanned autonomous vehicle is interfaced with a wireless communication system, such as a mobile communication system (e.g., a 5g, 4g, or 3g mobile communication system), for exchanging in real time large amounts of data. The data exchange may involve both directions, i.e. from the wireless communication system to the unmanned autonomous vehicle, and from the unmanned autonomous vehicle to the wireless communication system. For example, a remote automatic computer drive system may send drive commands to the unmanned autonomous vehicle through the wireless communication system, and the unmanned autonomous vehicle may directly send through the wireless communication system to a remote recipient data collected by on-board sensor devices (such as video cameras, scanners, thermographic cameras, environmental sensors and the like).

For these kinds of applications, the wireless communication system should be capable of guaranteeing sufficiently high levels of QoS, such as above predefined QoS levels, even when the wireless communication system is congested and/or has to manage high volumes of data traffic caused by other concurrent data transmission requests.

WO 2018/144761 discloses systems, methods, and instrumentalities for a wireless transmit/receive unit (WTRU) configured to receive a configuration defining a dedicated radio resource assignment for a travel path of autonomous vehicle, wherein the dedicated radio resource assignment comprises dedicated resources assigned to the WTRU in a plurality of cells and specifies a time interval when the resources will be dedicated to the WTRU in each of the plurality of cells; determine a first time has been reached and utilize dedicated resources in a first cell based on reaching the first time; and determine a second time has been reached and utilize dedicated resources in a second cell based on reaching the second time.

SUMMARY OF THE INVENTION

The Applicant has found that the solutions known in the art are not satisfactory because, even in case the communication system is configured to declare to carry out a dedicated radio resources assignment for data transmissions between the communication system and the vehicle, the actual QoS of said data transmissions is not guaranteed.

In view of the above, the Applicant has devised an improved system and method for managing QoS provided by a wireless communication system for the communication between an unmanned autonomous vehicle and the wireless communication system which is not affected by the drawbacks of the known solutions.

An aspect of the present invention relates to a system for managing QoS provided by a wireless communication system to a user equipment included in an unmanned autonomous vehicle adapted to communicate with the wireless communication system.

According to an embodiment of the present invention, the wireless communication system comprises base stations each one providing radio coverage over a corresponding cell.

According to an embodiment of the present invention, the system comprises a setup module configured to receive data identifying a predetermined path crossing at least one of said cells the unmanned autonomous vehicle is scheduled to travel on, and accordingly send to a radio scheduler module of the wireless communication system a request of allocating dedicated radio resources for wireless links between said user equipment and base stations corresponding to cells crossed by the predetermined path.

According to an embodiment of the present invention, said requested dedicated radio resources is expected to be sufficient to guarantee a QoS not lower than a predefined QoS value.

According to an embodiment of the present invention, the system comprises a QoS verify module configured to receive from the user equipment QoS data indicative of measured QoS actually experienced by the user equipment during the traveling of the unmanned autonomous vehicle.

According to an embodiment of the present invention, the QoS verify module is further configured to receive from the user equipment position data (P(x)) indicative of an actual position of the unmanned autonomous vehicle during the traveling of the unmanned autonomous vehicle.

According to an embodiment of the present invention, the QoS verify module is further configured to verify whether the QoS actually experienced by the user equipment during the travelling carried out by the unmanned autonomous vehicle is not lower than the predefined QoS value according to said received QoS data and verify whether the actual path followed by the unmanned autonomous vehicle during its travelling corresponds to said predetermined path according to said received position data.

According to an embodiment of the present invention, the QoS verify module is further configured to generate a QoS index quantifying the QoS actually experienced by the user equipment during the travelling carried out by the unmanned autonomous vehicle according to the received QoS data.

According to an embodiment of the present invention, the QoS verify module is further configured to generate a travel index indicative of the actual path followed by the unmanned autonomous vehicle during its travelling according to the received position data.

According to an embodiment of the present invention, the system further comprises a fare calculator module configured calculate a fare to be charged to a user of the unmanned autonomous vehicle according to said QoS index and said travel index.

According to an embodiment of the present invention, the QoS verify module is configured to set the travel index to a first value if the received position data shows that the unmanned autonomous vehicle followed the predetermined path, and to a second value if the received position data shows that the unmanned autonomous vehicle did not follow the predetermined path.

According to an embodiment of the present invention, the QoS verify module is configured to set the QoS index to:
- an average value obtained by averaging the QoS data received by the user equipment during the path carried out by the unmanned autonomous vehicle, or
- the lowest QoS data received by the user equipment during the path carried out by the unmanned autonomous vehicle.

According to an embodiment of the present invention, the fare calculator module is configured to set the fare to a predetermined fare value if one of the two following conditions are verified:
- the travel index is at the first value and at the same time the QoS index is equal to or higher than the predefined QoS value, and
- the travel index is at the second value.

According to an embodiment of the present invention, the fare calculator module is configured to set the fare to a reduced fare value lower than the predetermined fare value if:
- the travel index is at the first value and at the same time the QoS index is lower than the predefined QoS value.

According to an embodiment of the present invention, the system further comprises a certification module configured to certify the trustworthiness of the QoS data and of the position data sent by the user equipment during the traveling of the unmanned autonomous vehicle, and store the certified QoS data and position data into a corresponding data structure.

According to an embodiment of the present invention, the certification module is configured to enrich the QoS data and position data with localization data about the position of the user equipment generated by a network localization module of the wireless communication system.

According to an embodiment of the present invention, said data structure comprises at least one blockchain.

According to an embodiment of the present invention, the QoS data and/or the position data are electronically signed before being transmitted by the user equipment with a private key, and/or are stored in the data structure in an encrypted way exploiting a public key.

According to an embodiment of the present invention, said private key and said public key are stored in a subscriber identity module of the user equipment.

According to an embodiment of the present invention, the QoS verify module is configured to receive said QoS data when the unmanned autonomous vehicle is traveling.

According to an embodiment of the present invention, the QoS verify module is configured to receive said position data when the unmanned autonomous vehicle is traveling.

Another aspect of the present invention relates to a method for managing QoS provided by a wireless communication system to a user equipment included in an unmanned autonomous vehicle adapted to communicate with the wireless communication system.

According to an embodiment of the present invention, the wireless communication system comprises base stations each one providing radio coverage over a corresponding cell.

According to an embodiment of the present invention, the method comprises receiving data identifying a predetermined path crossing at least one of said cells the unmanned autonomous vehicle is scheduled to travel on.

According to an embodiment of the present invention, the method comprises sending to a radio scheduler module of the wireless communication system a request of allocating dedicated radio resources for wireless links between said user equipment and base stations corresponding to cells crossed by the predetermined path PP.

According to an embodiment of the present invention, said requested dedicated radio resources is expected to be sufficient to guarantee a QoS not lower than a predefined QoS value.

According to an embodiment of the present invention, the method comprises receiving from the user equipment QoS data indicative of measured QoS actually experienced by the user equipment during the traveling of the unmanned autonomous vehicle, and position data indicative of an actual position of the unmanned autonomous vehicle during the traveling of the unmanned autonomous vehicle.

According to an embodiment of the present invention, the method further comprises verifying whether the QoS actually experienced by the user equipment during the travelling carried out by the unmanned autonomous vehicle is not lower than the predefined QoS value according to said received QoS data and verifying whether the actual path followed by the unmanned autonomous vehicle during its travelling corresponds to said predetermined path according to said received position data.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION

Figure 1:
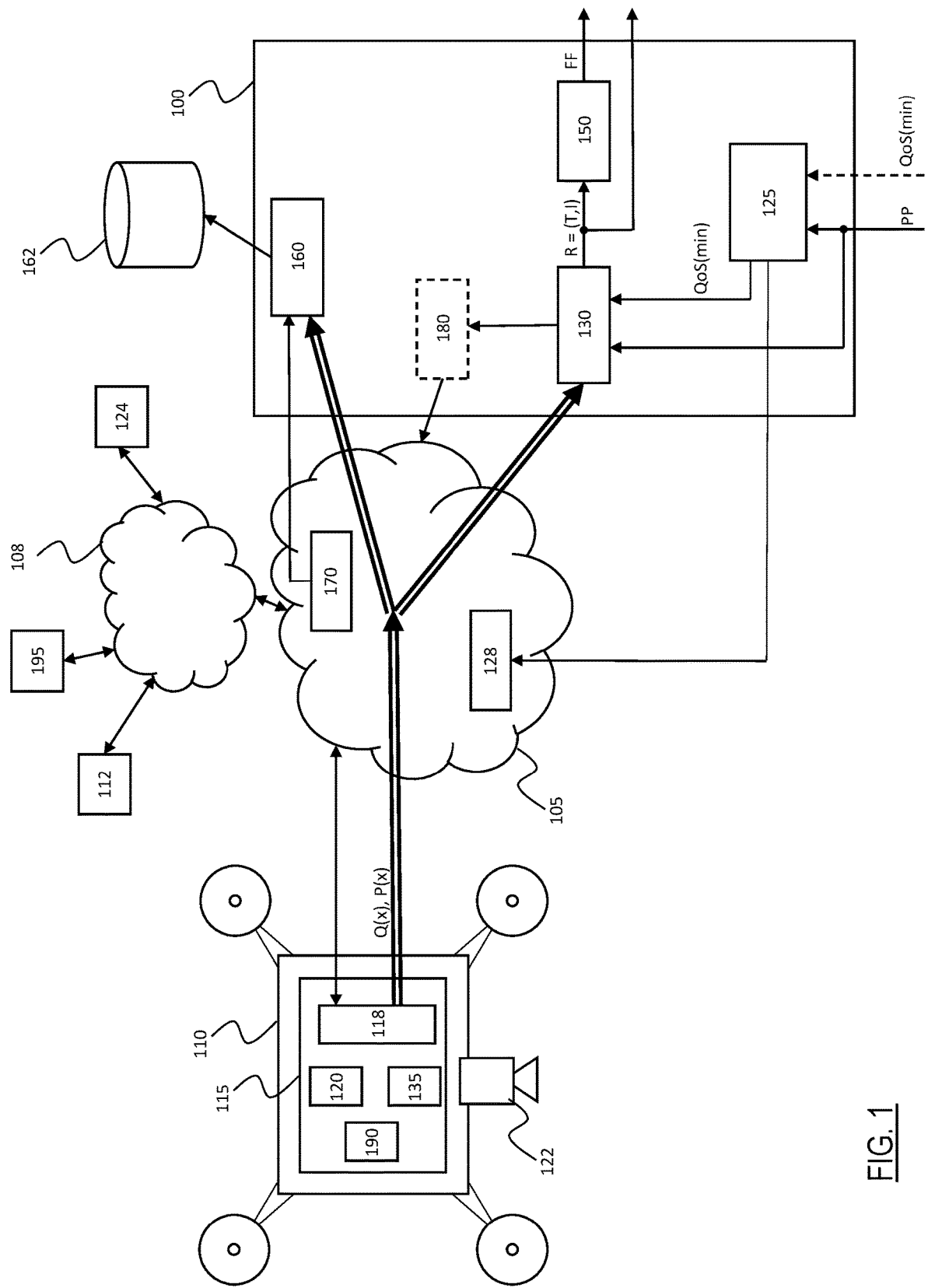
FIG. 1 illustrates a system for the management of QoS according to an embodiment of the present invention.

With reference to the drawings, FIG. 1 illustrates in terms of functional modules a system 100 (hereinafter briefly referred to as "management system") for managing the QoS provided by a wireless communication system to an unmanned autonomous vehicle according to an embodiment of the present invention.

It should be noted that the terms 'unit', 'system' or 'module' are herein intended to comprise, but not limited to, hardware, firmware, a combination of hardware and software, software.

For example, a unit, system or module may be, but is not limited to being, a process running on a processor, a processor, an object, an executable, a thread of execution, a program, and/or a computing device.

In other words, a unit, system or module may comprise an application being executed on a computing device and/or the computing device itself.

One or more units, systems or modules may be localized on one computing device and/or distributed between two or more computing devices.

Units, systems or modules may comprise and/or interact with computer readable media storing data according to various data structures.

The wireless communication system, globally identified in figure with reference 105 is configured to carry out wireless data transmissions for exchanging data with one or more User Equipment (UE) connected to the wireless communication system 105. Hereinafter, by User Equipment (UE) it is generally intended any communication module adapted to communicate, i.e., exchange data, with the wireless communication system 105. The wireless communication system 105 comprises a core network (not illustrated) configured to provide aggregation, authentication, call control/switching, charging, service invocation, gateway and subscriber database functionalities, or at least a subset thereof. Without losing generality, the core network may for example be a 3G, 4G/LTE or a 5G core network. The wireless communication system 105 comprises an access network (not illustrated) including base stations providing radio coverage over a corresponding geographic area—referred to as cell—for establishing a wireless link with UE located in said cell. In this way, said UE are able to access content providers through communication networks, such as the Internet 108. The wireless link may be established using any suitable radio access technology. Such as for example UTRA ("UMTS Terrestrial Radio Access"), WCDMA ("Wideband Code Division Multiple Access"), CDMA2000, GERAN ("GSM EDGE Radio Access Network"), LTE ("Long Term Evolution"), LTE-Advanced, and NR ("New Radio").

The unmanned autonomous vehicle, identified in figure with reference 110, may be for example a flying drone capable of flying without a pilot, and configured to fly in an automatic way by means of an automatic drive system. Naturally, the concepts of the present invention can be directly applied to other kinds of unmanned autonomous vehicles, such as UAVs, sea gliders, automated robot vehicles, self-driving cars.

According to an embodiment of the present invention, the automatic drive system 112 is remote with respect to the unmanned autonomous vehicle 110 itself, and communicates with the latter by exchanging driving commands in form of data through the internet 108. According to an embodiment of the present invention, in order to access the internet 108 for receiving the driving commands from the automatic drive system 112, the unmanned autonomous vehicle 110 is equipped with a UE 115 comprising a communication module 118 configured to connect with the wireless communication system 105 (by establishing a wireless link with the access network thereof) for allowing exchange of data.

According to an embodiment of the present invention, the communication module 118 is SIM based, such as comprising a Subscriber Identity Module (SIM) for example a SIM card or an embedded SIM (eSIM), identified in the figure with reference 120.

According to an embodiment of the present invention, the unmanned autonomous vehicle 110 further comprises at least one on-board sensor device 122, for example comprising one or more of a video camera, a scanner, a thermographic camera, and environmental sensors, configured to collect and generate data to be sent by the UE 115, through the wireless communication system 105, to a remote recipient 124, such as for example a storage space accessible through the internet 108 (e.g., a cloud storage space).

According to an embodiment of the present invention, a user of an unmanned autonomous vehicle 110 may request, through the management system 100, that the wireless communication system 105 provides a predefined QoS value QoS(P) for the wireless data transmissions between the UE 115 and the wireless communication system 105 itself (e.g., for the exchange of data between the automatic drive system 112 and the UE 115 and/or for the exchange of data between the UE 115 and the remote recipient 124) when the unmanned autonomous vehicle 110 moves along a requested predetermined path PP crossing a geographic area corresponding to at least one cell of the wireless communication system 105. According to an embodiment of the present invention, the user of the unmanned autonomous vehicle 110 may purchase the requested predefined QoS from the operator of the wireless communication system 105 using any kind of payment, involving, for example, SIM wallet, cryptocurrency, direct credit card payment and so on.

According to an embodiment of the present invention, the management system 100 comprises a QoS setup module 125 configured to receive from a user of the unmanned autonomous vehicle 110 data describing the predetermined path PP. The QoS setup module 125 is configured to send, to a radio resource scheduler module 128 of the wireless communication system 105, a request of allocating dedicated radio resources for wireless links between the UE 115 located on the unmanned autonomous vehicle 110 and the base stations corresponding to cells crossed by the predetermined path PP. According to an embodiment of the present invention, the QoS setup module 125 calculates the requested dedicated radio resources in such a way to be expected to be sufficient to guarantee a QoS not lower than the predefined QoS value QoS(P).

According to an embodiment of the present invention, the management system 100 further comprises a QoS verify module 130.

According to an embodiment of the present invention, the QoS verify module 130 is configured to (e.g., periodically, such as every 5 seconds) receive from the UE 115 and through the wireless communication system 105 position data P(x) about an actual position of the unmanned autonomous vehicle 110 and accordingly assess whether the unmanned autonomous vehicle 110 is following/has traveled along the predetermined path PP or not based on the received position data P(x).

According to an embodiment of the present invention, the QoS verify module 130 is further configured to (e.g., periodically, such as every 5 seconds) receive from the UE 115 and through the wireless communication system 105 QoS data Q(x) about a measured QoS actually experienced by the UE 115 and accordingly assess whether the QoS experienced by the UE 115 during its motion has been at least equal to or higher than the predefined QoS value QoS(P), or if it has been lower than the predefined QoS value QoS(P), based on the received QoS data Q(x).

According to an embodiment of the present invention, the position data P(x) is generated by the unmanned autonomous vehicle 110 itself using an on-board geolocation module 135, such as a GPS module directly located on the UE 115 or in the unmanned autonomous vehicle 110.

According to an embodiment of the present invention, the QoS data Q(x) is generated and calculated by the UE 115 of the unmanned autonomous vehicle 110 according to the known Minimization of Drive Test (MDT) mechanism introduced in 3GPP Release 10 (see 3GPP TR 21.905-3GPP TS 37.320). According to the MDT mechanism, QoS is measured by carrying out one or more of the following QoS measurements carried out by the UE 115:

- Received Signal Received Power (RSRP);
- Received Signal Received Quality (RSRQ);
- Block Error Rate (BLER) for signaling data and/or for information data;
- Volume of transmitted data;
- Scheduled IP throughput;
- Packet delay;
- Packet loss rate;
- Round Trip Time (RTT);
- Rx/Tx UE Time Difference.

According to an embodiment of the present invention, the above QoS measurements and the calculation of the QoS data Q(x), as well as the transmission of said QoS data Q(x) to the QoS verify module 130 of the management system 100 are carried out in such a way to have a minimum impact on the signaling load, as well as on the power consumption. For example, according to an embodiment of the present invention, the QoS data Q(x) is sent to the QoS verify module 130 using the Radio Resource Control (RCC) protocol during a network signaling phase.

According to an embodiment of the present invention, the QoS data Q(x) is sent to the QoS verify module 130 together with the position data P(x) obtained through the GPS module 135.

According to an embodiment of the present invention, the QoS verify module 130 is configured to provide the user of the unmanned autonomous vehicle 110 with results R of the verify operations, i.e., whether the unmanned autonomous vehicle 110 has travelled along the predetermined path PP or not, and whether the QoS actually experienced by the UE 115 along its path has respected or not the predefined QoS requirement set by the predefined QoS value QoS(P).

According to an embodiment of the present invention, the results R comprise a travel index T indicative of the actual path followed by the unmanned autonomous vehicle 110 and a QoS index I indicative of the QoS actually experienced by the UE 115 during the travel of the unmanned autonomous vehicle 110.

According to an embodiment of the present invention, the travel index T is set to a first value T1 if the collected position data P(x) show that the unmanned autonomous vehicle 110 followed the predetermined path PP (e.g., at least for a sufficiently large portion thereof), and is set to a second value T2 if the collected position data P(x) show that the unmanned autonomous vehicle 110 did not follow the predetermined path PP (e.g., at least for a sufficiently large portion thereof).

According to an embodiment of the present invention, the QoS index I is set to an average value QoS(A) obtained by averaging the plurality of QoS data Q(x) sent by UE 115 during the whole (or at least a relevant part of the) path carried out by the unmanned autonomous vehicle 110.

According to another embodiment of the present invention, the QoS index I is set to the lowest QoS data Q(x) sent by the UE 115 during the whole (or at least a relevant part of the) path carried out by the unmanned autonomous vehicle 110.

According to an embodiment of the present invention, the QoS verify module is configured to assess that the offered predefined QoS requirement has been fulfilled if the QoS index I is equal to or higher than the predefined QoS value QoS(P), and to assess that the requirement has not been fulfilled if the QoS index I is lower than the predefined QoS value QoS(P).

According to an embodiment of the present invention, the management system 100 further comprises a final fare calculator module 150 configured to calculate a finale fare FF to be charged to the user of the unmanned autonomous vehicle 110 for the requested predefined QoS along the predetermined path PP.

According to an embodiment of the present invention, the final fare calculator module 150 is configured to calculate the finale fare FF based on the results R of the verify operations generated by the QoS verify module 130.

According to an embodiment of the present invention, the final fare calculator module 150 is configured to set the final fare FF to a prearranged value, for example agreed upon with the user when the user of the unmanned autonomous vehicle 110 requested a predefined QoS along the predetermined path PP, if the results R of the verify operations show that the unmanned autonomous vehicle 110 has travelled along the predetermined path PP (i.e., T=T1), and at the same time the QoS actually experienced by the UE 115 along its path has respected the predefined QoS requirement set by the predefined QoS value QoS(P) (i.e. I≥QoS(P)).

According to an embodiment of the present invention, the final fare calculator module 150 is configured to set the final fare FF to a value lower than the abovementioned prearranged value if the results R of the verify operations show that the unmanned autonomous vehicle 110 has travelled along the predetermined path PP (i.e., T=T1), but the QoS actually experienced by the UE 115 along its path has not respected the predefined QoS requirement set by the predefined QoS value QoS(P) (i.e. I<QoS(P)). The discounted final fare FF is in this case provided to the user of the unmanned autonomous vehicle 110 as a compensation for the too low QoS (lower than the predefined QoS value QoS(P)) the wireless communication system 105 actually provided.

According to an embodiment of the present invention, the final fare calculator module 150 is configured to set the final fare FF to the prearranged value irrespective of the QoS actually experienced by the UE 115 along its path if the results R of the verify operations show that the unmanned autonomous vehicle 110 has travelled along a path different from the predetermined path PP (i.e., T=T2). In other words, no discount is granted in case the unmanned autonomous vehicle 110 did not respect the planned predetermined path PP.

Although in the embodiment of the invention described above the payment of the final fare FF is made by the user of the unmanned autonomous vehicle 110 once the unmanned autonomous vehicle 110 completed the travel, the concepts of the present invention can be applied to the case in which the user pays in advance (i.e., before the unmanned autonomous vehicle started its travel) a prearranged value, and then, in case the final fare FF calculated by the final fare calculator module 150 at the end of the travel is lower than the prearranged value, a refund, or a discount for a next use of the service is granted to the user.

According to an embodiment of the present invention, the predefined QoS value QoS(P) is a fixed value, which is predetermined in advance by the operator of the wireless communication system 105. According to another embodiment of the present invention, instead of having a single fixed predefined QoS value QoS(P), a plurality of different predefined QoS values QoS(P) can be requested, each one corresponding to a different price (i.e., corresponding to a different prearranged value used for calculating the final fare FF).

According to an embodiment of the present invention, in order to increase the reliability of the data used by the QoS verify module 130, the management system 100 further comprises a certification module 160 configured to certify the trustworthiness of the QoS data Q(x) and the position data P(x) sent by the UE 115 during the travel of the unmanned autonomous vehicle 110, and store the certified QoS data Q(x) and position data P(x) in a corresponding data structure 162. The data structure 162 can be accessed by the user of the unmanned autonomous vehicle 110 for allowing the user to check the trustworthiness of the QoS data Q(x) and the position data P(x) and therefore of the calculated final fare FF.

According to an embodiment of the present invention, the certification module 160 is configured in such a way that, each time new QoS data Q(x) and position data P(x) are received from the UE 115, it requests from a network localization module 170 of the wireless communication network 105 localization data LD about the position of the UE 115 and enrich the received QoS data Q(x) and position data P(x) with said localization data. For example, said localization data LD can be generated by the network localization module 170 using one of the known network mechanisms that allow to identify the location from which an intercepted transmission is carried out, such as the "Enhanced Cell ID" method described in 3GPP TS 38.305 V15.4.0 or one of the positioning methods described in the white paper "5G Localization and Context-Awareness" by Stefania Bartoletti, Andrea Conti, Davide Dardari, and Andrea Giorgetti (https://www.5gitaly.eu/2018/wp-content/uploads/2019/01/5G-Italy-White-eBook-5G-Localization.pdf).

According to an embodiment of the present invention, the QoS data Q(x) and/or the position data P(x) are electronically signed before being transmitted by the UE 115 with a private key PK. According to an embodiment of the present invention, the private key PK is advantageously stored in the SIM 120 of the UE 115.

According to an embodiment of the present invention, in order to avoid fraudulent alteration of the QoS data Q(x) and position data P(x), such data can be advantageously stored in the data structure 162 in an encrypted way. According to an embodiment of the invention, the QoS data Q(x) and position data P(x) are encrypted with an encryption algorithm exploiting a public encryption key EK. According to an embodiment of the present invention, the public key EK is advantageously stored in the SIM 120 of the UE 115.

According to an embodiment of the present invention, the data structure 162 is a distributed data structure like, e.g., a blockchain.

If the wireless communication system 105 is sufficiently evolved, such as in case of a wireless communication system 105 compliant with the 5g standard, the base stations thereof are capable of implementing beamforming by directing signals in specific directions without incurring in (too heavy) interferences problems using a Multiple-Input and Multiple-Output (MIMO) transmission scheme. According to an embodiment of the present invention, the beamforming capability can be advantageously exploited by the management system 100 to optimize the QoS experienced by the UE 115 during the travel of the unmanned autonomous vehicle 100 along the predetermined path PP.

For this purpose, according to an embodiment of the present invention, the management system 100 may comprise a QoS optimization module 180 configured to request the wireless communication system 105 to (at least try to) increase the QoS experienced by the UE 115 using beamforming when the QoS data Q(x) are lower than the predefined QoS value QoS(P). In order to carry out beamforming to increase the QoS experienced by the UE 115, it is necessary to identify the position of the UE 115 with respect to the base stations of the wireless communication system. For this purpose, according to an embodiment of the invention, the actual position of the unmanned autonomous vehicle 110 is provided to the wireless communication systems 105 by retrieving (for example from the QoS verify module 130) the last received position data P(x).

According to an embodiment of the present invention, the unmanned autonomous vehicle 110 is equipped with an Unmanned Traffic Management (UTM) module 190 configured to provide vehicle identification and position data U(x)—comprising an identifier of the unmanned autonomous vehicle 110, and its altitude and geographical position—to an unmanned autonomous vehicle traffic control and monitoring system 195 responsible to manage traffic according to safety standard regulations. For example, the vehicle traffic control and monitoring system can be used in cooperation with the Global UTM Association (GUTMA).

According to an embodiment of the present invention, the QoS verify module 130 is configured to receive said vehicle identification and position data U(x) from the unmanned autonomous vehicle traffic control and monitoring system 195. In this way, according to an embodiment of the present invention, the QoS verify module 130 may advantageously exploit said vehicle identification and position data U(x) for merging it with the position data P(x) and therefore increasing the accuracy with which the position of the unmanned autonomous vehicle 110 is identified.

According to an embodiment of the present invention, some of the operations carried out by the QoS verify module 130 and/or by the final fare calculator module 150 can be implemented using one or more blockchain data structures. For example, according to an embodiment of the present invention:
  a private blockchain, such as the Hyperledger blockchain, can be used to store (e.g., an encrypted version of) the QoS data Q(x) generated by the UE 115 during the travel of the unmanned autonomous vehicle 110, and to calculate and store the QoS index I at the end of the travel of the unmanned autonomous vehicle 110 using the stored QoS data Q(x), and
  a public blockchain, such as the Ethereum blockchain, can be used to calculate and store the final fare FF by exploiting the QoS index I stored in the private blockchain.

According to an embodiment of the present invention, the operations implemented by the blockchain data structures may be based on proper smart contracts (installed in the blockchains) whose execution bind the user of the unmanned autonomous vehicle 110 and the operator of the wireless communication system 105 based on predefined provisions.

For example, a first smart contract may be configured in a private blockchain, comprising the following three features 1.1, 1.2, 1.3.
  1.1) A first feature may be called at the beginning of the travel of the unmanned autonomous vehicle 110, using as input parameters an identification code ISIM of the SIM 120 of the UE 115, an identification code ITR corresponding to the specific travel to be carried out by the unmanned autonomous vehicle 110, and a timestamp value TSV.
  1.2) A second feature may be periodically called during the travel of the unmanned autonomous vehicle 110, with a frequency based on the timestamp value TSV, which stores in the private blockchain the QoS data Q(x) received by the UE 115 identified by the identification code ISIM and corresponding to the travel identified by identification code ITR.

1.3) A third feature may be called at the end of the travel of the unmanned autonomous vehicle 110, which calculates and stores in the private blockchain the QoS index I using the stored QoS data Q(x).

For example, a second smart contract may be configured in a public blockchain, comprising the following two features 2.1, 2.2.

2.1) A first feature may be called for calculating and storing in the public blockchain the final fare FF by exploiting the QoS index I stored in the private blockchain.

2.2) A second feature may be called to charge the final fare FF to the user, for example exploiting a SIM wallet or cryptocurrency.

According to an embodiment of the present invention, also the position data P(x) of the unmanned autonomous vehicle 110 can be stored in one or both said blockchain data structures.

Naturally, the concepts of the present invention can be directly applied also to case in which different blockchain data structures are used, or also a single blockchain data structure is used for storing the QoS data Q(x), the QoS index I, the position data P(x) and/or the final fare FF.

Figure 2:
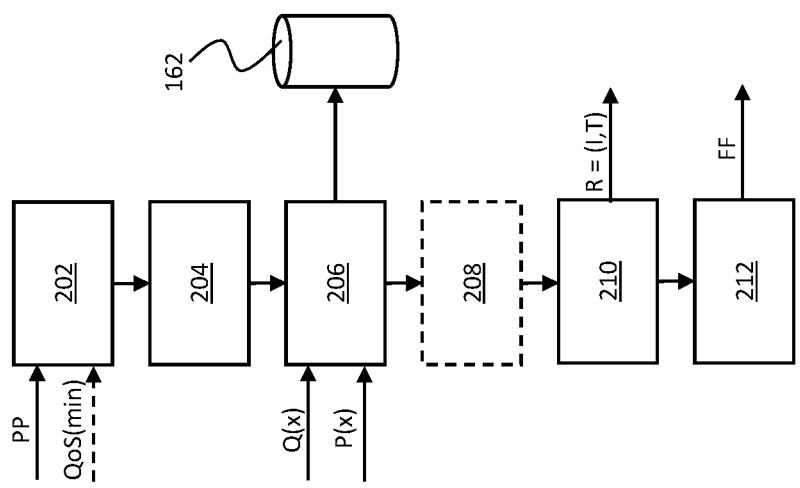
FIG. 2 is a flowchart illustrating the main operations carried out by the system of FIG. 1 according to an embodiment of the present invention.

FIG. 2 is a flowchart illustrating the main operations carried out by the management system 100 of FIG. 1 according to an embodiment of the present invention.

The first operation carried out by the management system 100 provides for receiving from a user of an unmanned autonomous vehicle 110 a request of a predefined QoS value QoS(P) to be provided by the wireless communication system 105 for the wireless data transmissions between the UE 115 and the wireless communication system 105 itself when the unmanned autonomous vehicle 110 moves along a requested predetermined path PP (block 202). For this purpose, the user provides to the QoS setup module 125 the requested predetermined path PP and, optionally, the value of the desired predefined QoS value QoS(P).

The QoS setup module 125 sends to the radio resource scheduler module 128 of the wireless communication system 105 a request for allocating dedicated radio resources for wireless links between the UE 115 located on the unmanned autonomous vehicle 110 and the base stations corresponding to cells crossed by the predetermined path PP (block 204).

At this point, when the unmanned autonomous vehicle 110 moves, the on-board UE 115 generates QoS data Q(x) and position data P(x) to be provided, through the wireless communication system 105, to the QoS verify module 130 (block 206). For example, as long as the unmanned autonomous vehicle 110 is traveling, new QoS data Q(x) and position data P(x) are provided (e.g., periodically, such as every 5 seconds) to the QoS verify module 130. According to an embodiment of the present invention, said QoS data Q(x) and position data P(x) are signed and encrypted using keys stored in the SIM 120 of the UE 115. According to an embodiment of the present invention, the (possibly signed and encrypted) QoS data Q(x) and position data P(x) are stored in the data structure 162.

If the management system 100 is provided with a QoS optimization module 180, and if the QoS data Q(x) is lower than the predefined QoS value QoS(P), the QoS optimization module 180 may request the wireless communication system 105 to increase the QoS experienced by the UE 115 through beamforming (block 208).

Once the unmanned autonomous vehicle 110 completed its travel, the QoS verify module 130 calculates results R comprising a travel index T indicative of the actual path followed by the unmanned autonomous vehicle 110 and a QoS index I indicative of the QoS actually experienced by the UE 115 (block 210).

Based on the calculated results R, the final fare calculator module 150 calculates the final fare FF to be charged to the user of the unmanned autonomous vehicle 110 (block 212).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A system for managing QoS provided by a wireless communication system to user equipment included in an unmanned autonomous vehicle adapted to communicate with the wireless communication system, the wireless communication system comprising base stations each one providing radio coverage over a corresponding cell, the system comprising:
one or more computing devices configured to execute a plurality of application modules stored thereon, the application modules comprising:
a setup module configured to receive data identifying a predetermined path crossing at least one of the cells the unmanned autonomous vehicle is scheduled to travel on, and accordingly send to a radio scheduler module of the wireless communication system a request of allocating dedicated radio resources for wireless links between the user equipment and base stations corresponding to cells crossed by the predetermined path, the requested dedicated radio resources being expected sufficient to guarantee a QoS not lower than a predefined QOS value, and
a QoS verify module configured to:
receive from the user equipment QoS data indicative of measured QoS actually experienced by the user equipment during the traveling of the unmanned autonomous vehicle;
receive from the user equipment position data indicative of an actual position of the unmanned autonomous vehicle during the traveling of the unmanned autonomous vehicle; and
verify whether the QoS actually experienced by the user equipment during the traveling carried out by the unmanned autonomous vehicle is not lower than the predefined QoS value according to the received QoS data and verify whether an actual path followed by the unmanned autonomous vehicle during its traveling corresponds to the predetermined path according to the received position data.

2. The system of claim 1, wherein the QoS verify module is further configured to:
   generate a QoS index quantifying the QoS actually experienced by the user equipment during the travelling carried out by the unmanned autonomous vehicle according to the received QoS data, and
   generate a travel index indicative of the actual path followed by the unmanned autonomous vehicle during its travelling according to the received position data.

3. The system of claim 2, wherein the application modules further comprise a fare calculator module configured calculate a fare to be charged to a user of the unmanned autonomous vehicle according to the QoS index and the travel index.

4. The system of claim 2, wherein the QoS verify module is configured to set the travel index to a first value if the received position data shows that the unmanned autonomous vehicle followed the predetermined path, and to a second value if the received position data shows that the unmanned autonomous vehicle did not follow the predetermined path.

5. The system of claim 2, wherein the QoS verify module is configured to set the QoS index to:
   an average value obtained by averaging the QoS data received by the user equipment during the actual path carried out by the unmanned autonomous vehicle, or
   the lowest QoS data received by the user equipment during the actual path carried out by the unmanned autonomous vehicle.

6. The system of claim 5, wherein the application modules further comprise a fare calculator module configured to calculate a fare to be charged to a user of the unmanned autonomous vehicle according to the QoS index and the travel index,
   wherein the QoS verify module is configured to set the travel index to a first value if the received position data shows that the unmanned autonomous vehicle followed the predetermined path, and to a second value if the received position data shows that the unmanned autonomous vehicle did not follow the predetermined path, and
   wherein the fare calculator module is configured to set the fare to a predetermined fare value if one of the two following conditions are verified:
      the travel index is at the first value and at the same time the QoS index is equal to or higher than the predefined QoS value, and
      the travel index is at the second value.

7. The system of claim 6, wherein the fare calculator module is configured to set the fare to a reduced fare value lower than the predetermined fare value if:
   the travel index is at the first value and at the same time the QoS index is lower than the predefined QOS value.

8. The system of claim 1, wherein the application modules further comprise a certification module configured to certify trustworthiness of the QOS data and the position data sent by the user equipment during the traveling of the unmanned autonomous vehicle, and store the certified QoS data and position data into a corresponding data structure.

9. The system of claim 8, wherein the certification module is configured to enrich the QoS data and position data with localization data about a position of the user equipment generated by a network localization module of the wireless communication system.

10. The system of claim 8, wherein the data structure comprises at least one blockchain.

11. The system of claim 8, wherein the QoS data or the position data are electronically signed before being transmitted by the user equipment with a private key, or are stored in the data structure in an encrypted way exploiting a public key.

12. The system of claim 11, wherein the private key and the public key are stored in a subscriber identity module of the user equipment.

13. The system of claim 1, wherein the QoS verify module is configured to receive the QoS data and the position data when the unmanned autonomous vehicle is traveling.

14. Method for managing QoS provided by a wireless communication system to user equipment included in an unmanned autonomous vehicle adapted to communicate with the wireless communication system, the wireless communication system comprising base stations, each base station providing radio coverage over a corresponding cell, the method comprising:
   receiving data identifying a predetermined path crossing at least one of the cells the unmanned autonomous vehicle is scheduled to travel on,
   sending to a radio scheduler module of the wireless communication system a request of allocating dedicated radio resources for wireless links between the user equipment and base stations corresponding to cells crossed by the predetermined path, the requested dedicated radio resources being expected sufficient to guarantee a QoS not lower than a predefined QoS value,
   receiving from the user equipment QoS data indicative of measured QoS actually experienced by the user equipment during the traveling of the unmanned autonomous vehicle, and position data indicative of an actual position of the unmanned autonomous vehicle during the traveling of the unmanned autonomous vehicle, and
   verifying whether the QoS actually experienced by the user equipment during the traveling carried out by the unmanned autonomous vehicle is not lower than the predefined QoS value according to the received QoS data and verifying whether an actual path followed by the unmanned autonomous vehicle during its travelling corresponds to the predetermined path according to the received position data.

* * * * *